(12) United States Patent  (10) Patent No.: US 10,764,589 B2
Lee  (45) Date of Patent: Sep. 1, 2020

(54) METHOD AND MODULE FOR PROCESSING IMAGE DATA

(71) Applicant: TRISYS Co., LTD, Seongnam-si (KR)

(72) Inventor: Seung Won Lee, Buk-Gu (KR)

(73) Assignee: Trisys Co., LTD. (KR)

(*) Notice: Subject to any disclaimer, the term of this patent is extended or adjusted under 35 U.S.C. 154(b) by 0 days.

(21) Appl. No.: 16/163,653

(22) Filed: Oct. 18, 2018

(65) Prior Publication Data
US 2020/0128257 A1    Apr. 23, 2020

(51) Int. Cl.
H04N 5/247    (2006.01)
H04N 5/265    (2006.01)
G06K 9/46     (2006.01)
G06K 9/62     (2006.01)
H04N 19/176   (2014.01)
H04N 19/182   (2014.01)

(52) U.S. Cl.
CPC ......... H04N 19/176 (2014.11); H04N 19/182 (2014.11)

(58) Field of Classification Search
CPC .................... H04N 19/176; H04N 19/182
USPC ....................................... 375/240.12
See application file for complete search history.

(56) References Cited

U.S. PATENT DOCUMENTS

| | | | | |
|---|---|---|---|---|
| 5,754,303 A * | 5/1998 | Ito | ......................... | H04N 1/4056 358/1.9 |
| 6,034,787 A * | 3/2000 | Hashimoto | .......... | H04N 1/4056 358/1.13 |
| 8,648,873 B1 * | 2/2014 | Tantalo | ...................... | G06T 5/40 345/589 |
| 9,230,193 B1 * | 1/2016 | Nam | ...................... | G06F 16/583 |
| 9,838,614 B1 * | 12/2017 | Brailovskiy | .......... | G06T 3/4038 |
| 2006/0023788 A1 * | 2/2006 | Otsuka | ................... | H04N 19/56 375/240.16 |
| 2009/0046781 A1 * | 2/2009 | Moriya | ................ | H04N 19/105 375/240.12 |
| 2009/0273677 A1 * | 11/2009 | Huynh-Thu | ............. | H04N 9/67 348/180 |
| 2013/0308771 A1 * | 11/2013 | Raifel | ...................... | H04B 3/23 379/406.01 |
| 2014/0146927 A1 * | 5/2014 | Raifel | .................. | G05B 13/024 375/346 |
| 2014/0285489 A1 * | 9/2014 | Tang | ......................... | G06T 5/00 345/428 |

(Continued)

*Primary Examiner* — Zaihan Jiang

(57) ABSTRACT

Disclosed is a module for correcting and applying an input value applied to a plurality of pixels in a display including a plurality of pixels. The module includes a processor configured to determine a plurality of unit blocks by dividing the plurality of pixels in a preset unit, receive the first input value for a current pixel included in a current block of the plurality of unit blocks, determine a middle input value of a real number, by correcting the first input value by applying a gain value and offset value assigned to the current block, compare the product of a decimal value indicative of the decimal part of the middle input value and the size of the current block with a root value corresponding to the current pixel, determine the final input value by performing rounding-up or rounding-off on the middle input value based on a result of the comparison, and apply the final input value to the current pixel and memory configured to store the gain value, the offset value and the root value.

16 Claims, 14 Drawing Sheets

(56) References Cited

U.S. PATENT DOCUMENTS

2018/0007384 A1* 1/2018 Huang ................. H04N 19/533
2018/0176577 A1* 6/2018 Puri ...................... H04N 19/61

* cited by examiner

METHOD AND MODULE FOR PROCESSING IMAGE DATA

BACKGROUND OF THE INVENTION

Technical Field

The present disclosure relates to a method and module for processing image data.

Description of the Related Art

A display displays information through a screen and is widely used for various types of devices, such as home appliances, smartphones and monitors. The display has a very wide use range in providing information through an image, and resolution thereof implemented in an actual product continues to rise.

In particular, as the demand for mobile communication terminals, such as mobile phones or PDAs, recently continues to spread, the market of a display mounted on a mobile communication terminal expands exponentially.

However, there are made various efforts for reducing or removing a physical defect in software because the probability that a physical defect may occur in a process of fabricating the display is high.

SUMMARY OF THE INVENTION

The present disclosure may provide a method and module for processing image data. Specifically, there are disclosed a method and module for correcting an input value applied to a plurality of pixels. A technical object to be solved is not limited to the aforementioned objects and may further include various technical objects within a range evident to those skilled in the art.

A first aspect of the present disclosure provides a module for correcting and applying an input value applied to a plurality of pixels in a display including a plurality of pixels. The module may include a processor configured to determine a plurality of unit blocks by dividing the plurality of pixels in a preset unit, receive the first input value for a current pixel included in a current block of the plurality of unit blocks, determine a middle input value of a real number by correcting the first input value by applying a gain value and offset value assigned to the current block, compare the product of a decimal value indicative of the decimal part of the middle input value and the size of the current block with a root value corresponding to the current pixel, determine the final input value by performing rounding-up or rounding-off on the middle input value based on a result of the comparison, and apply the final input value to the current pixel and memory configured to store the gain value, the offset value and the root value.

Furthermore, the root value corresponding to the current pixel may be determined by a relative position of the current pixel within the current block and the size of the current block.

Furthermore, root values corresponding to N pixels included in the current block may have integers of different sizes from 1 to N.

Furthermore, the processor may be configured to divide the current block into a plurality of sections including a first section and a second section and to determine a root value corresponding to a second pixel included in the second section to be a+1 when a root value corresponding to a first pixel included in the first section may be a.

Furthermore, the processor may be configured to determine root values corresponding to pixels included in the current block so that root values corresponding to neighboring pixels of the plurality of pixels are not continuous. The root value may be an integer.

Furthermore, the processor may be configured to divide the current block into four sections including a first section to a fourth section and to determine a root value of a+1 to correspond to a pixel included in any one of the second section to the fourth section when a root value corresponding to a pixel included in the first section may be a.

Furthermore, the processor may be configured to determine root values corresponding to neighboring pixels included in the current block to not overlap when the size of the current block may be greater than 2×2.

Furthermore, if the size of the current block is greater than 2×2, the processor may be configured to determine a first root value and a second root value so that the first root value and second root value correspond to a first pixel and second pixel included in the current block, respectively, and an absolute value of a difference between the first root value and the second root value is 2 or more if the first pixel and the second pixel neighbor each other.

Furthermore, the root value corresponding to the current pixel may be determined by a coordinate value corresponding to the current pixel determined in a predetermined manner based on a relative position of the current pixel and the number of pixels included in the current block.

A second aspect of the present disclosure provides a correction method of correcting and applying an input value applied to a plurality of pixels in a display including the plurality of pixels. The method includes determining a plurality of unit blocks by dividing the plurality of pixels in a preset unit, receiving the first input value for a current pixel included in a current block of the plurality of unit blocks, determining a middle input value, that is, a real number, by correcting the first input value by applying a gain value and offset value assigned to the current block, comparing the product of a decimal value indicative of the decimal part of the middle input value and the size of the current block with a root value corresponding to the current pixel, determining the final input value by performing rounding-up or rounding-off on the middle input value based on a result of the comparison, and applying the final input value to the current pixel.

A third aspect of the present disclosure may provide a computer program stored in a recording medium in order to implement the method according to the second aspect. Alternatively, a fourth aspect of the present disclosure may provide a computer-readable recording medium in which a program for executing the method according to the second aspect in a computer has been written.

DETAILED DESCRIPTION

Terms used in embodiments are common terms which are now widely used by taking into consideration functions in the present invention, but the terms may be changed depending on an intention of those skilled in the art, a use practice, or the advent of a new technology. Furthermore, in a specific case, some terms are randomly selected by the applicant. In this case, the meaning of a corresponding term is described in a corresponding part of a corresponding invention. Accordingly, terms used in this specification should not be defined simply based on their names, but should be defined based on their substantial meanings and contents over this specification.

In the entire specification, unless explicitly described to the contrary, the word "include" and variations, such as "includes" or "including", will be understood to imply the inclusion of stated elements but not the exclusion of any other elements. Furthermore, the term " . . . unit" or "module" described in the specification means a unit for processing at least one function or operation, and the unit may be implemented by hardware or software or a combination of hardware and software.

The present invention is described more fully hereinafter with reference to the accompanying drawings, in which exemplary embodiments of the present invention are shown. As those skilled in the art would realize, the described embodiments may be modified in various different ways, all without departing from the spirit or scope of the present disclosure.

Embodiments of the present invention are described in detail with reference to the accompanying drawings.

Figure 1:
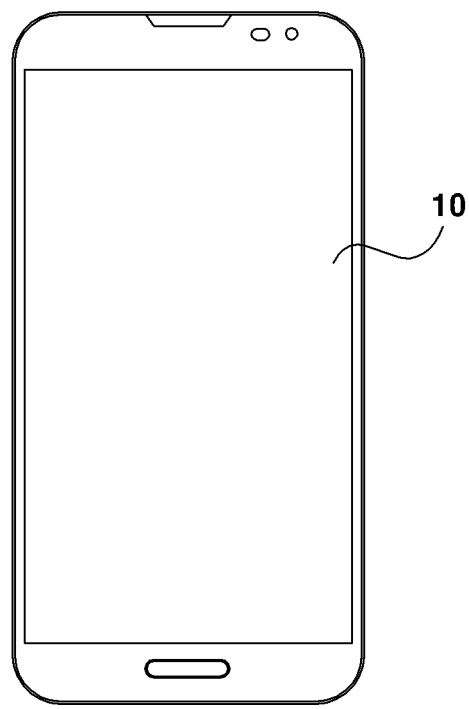
FIG. 1 shows an example of a device including a display according to an embodiment.

FIG. 1 shows an example of a device 1 including a display 10 according to an embodiment. The device 1 may include a given unit including the display 10. For example, the device 1 may include a smartphone, a monitor, television, a PDA, etc., but is not limited thereto.

The display 10 may output an image signal based on a received input value. The image signal may include all of various types of signals output from pixels, such as brightness, a red component, a green component, and a blue component. Furthermore, since a block consists of pixels, an embodiment of a block may be an embodiment of pixels. Accordingly, an operation performed in a pixel may be applied to a block in the same manner although the block is not separately described.

Furthermore, an image signal may be represented as an output value. For example, the output value may include a variety of numeral values that may be output from a pixel or block, such as a brightness value, a red component value, a green component value, and a blue component value.

When an input value corresponding to a preset gray value is applied to the display 10, the display 10 may display an image corresponding to the input value. For example, in an ideal case, when the same input value (e.g., a voltage value or a current value) is applied to pixels included in the display 10, the pixels included in the display 10 may output the same output value (e.g., brightness value). However, different output values may be output depending on a physical difference between pixels included in the display 10 substantially although the same input value is applied to the display 10.

An input value corresponding to a preset gray value is applied to pixels included in the display 10. For example, an input value (e.g., a voltage value or a current value) corresponding to the first gray value of gray values 0-n (e.g., 0-255) may be applied to pixels included in the display 10. In this case, the pixels included in the display 10 may output an output value (e.g., brightness value) corresponding to the first gray value.

A unit block may mean a block determined by dividing a plurality of pixels included in the display 10 according to a preset method. A current block may mean a unit block on which processing is being performed. Accordingly, a current block may be construed as being a unit block although the current block is written, and a unit block may be construed as being a current block depending on a point of time at which the unit block is processed although the unit block is written.

Figure 2:
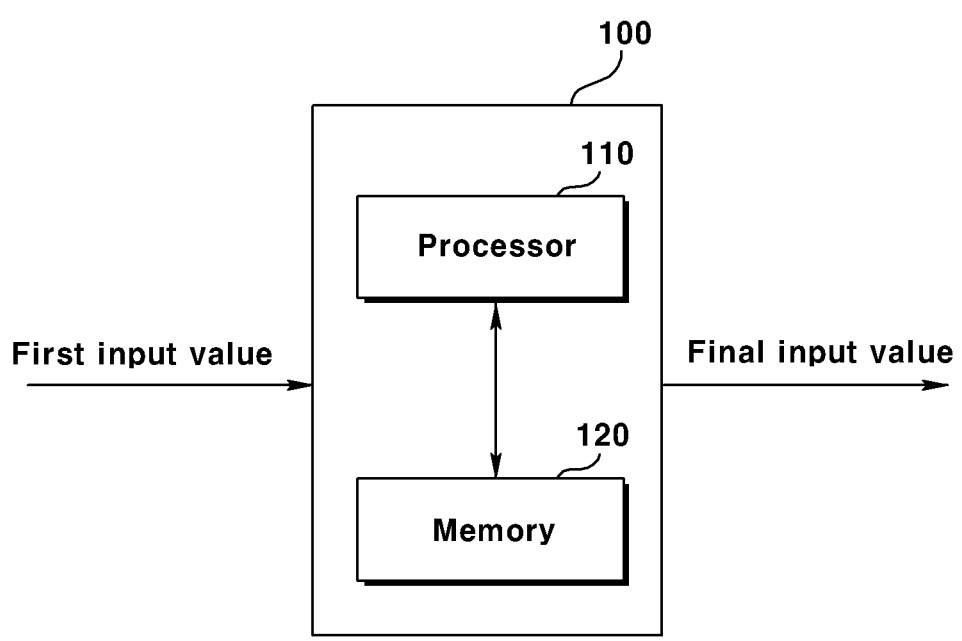
FIG. 2 is a block diagram showing an example of a module including a processor and memory according to an embodiment.

FIG. 2 is a block diagram showing an example of a module 100 including a processor 110 and memory 120 according to an embodiment.

As shown in FIG. 2, the module 100 may include the processor 110 and the memory 120.

However, a person having ordinary skill in the art will understand that other universal elements other than the elements of FIG. 2 may be further included in the module 100. Alternatively, in another embodiment, a person having ordinary skill in the art will understand that some of the elements shown in FIG. 2 may be omitted.

An input value may include all of the first input value, a middle input value and the final input value. Furthermore, referring to FIG. 2, the module 100 may receive the first input value and output the final input value. Specifically, an example in which the module 100 operates along with a plurality of pixels is shown in FIG. 3.

Figure 3:
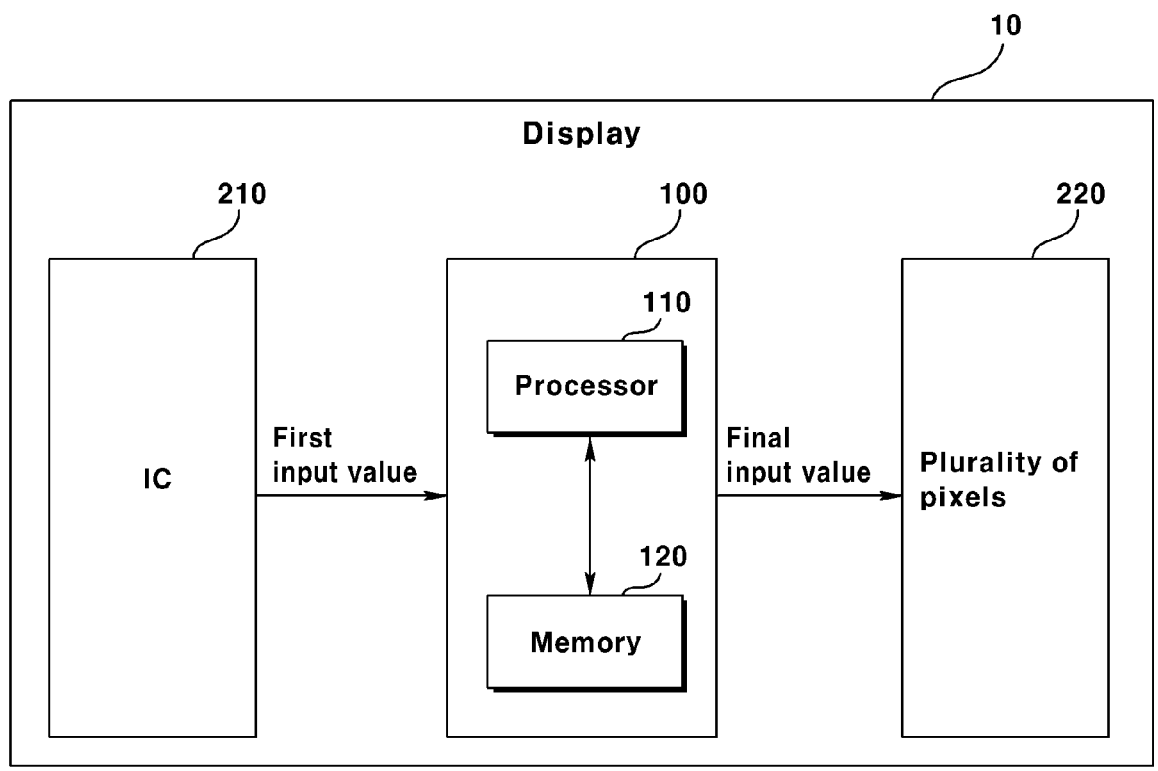
FIG. 3 is a block diagram showing an example of the display including the module according to an embodiment.

FIG. 3 is a block diagram showing an example of the display 10 including the module 100 according to an embodiment.

As shown in FIG. 3, the display 10 may include an IC 210, the module 100 and a plurality of pixels 220.

However, a person having ordinary skill in the art will understand that other universal elements other than the elements of FIG. 3 may be further included in the display 10. For example, the display 10 may further include additional memory (not shown). Alternatively, in another embodiment, a person having ordinary skill in the art will understand that some of the elements shown in FIG. 3 may be omitted.

The module 100 according to an embodiment may correct an input value applied to a plurality of pixels 220 in the display 10 including the plurality of pixels 220, and may apply the corrected value. Specifically, the module 100 may correct the received first input value and apply the final input value to the plurality of pixels 220.

The processor 110 may determine a plurality of unit blocks by dividing the plurality of pixels 220 in a preset unit. The module 100 may receive the first input value of a current pixel included in a current block of the plurality of unit blocks.

The processor 110 may determine a middle input value, that is, a real number, in such a way as to correct the first input value by applying a gain value and offset value assigned to a current block. The gain value and the offset value may be determined with respect to each unit block. For example, a first unit block and a second unit block may have different gain values and/or different offset values. The gain value and the offset value may be values used to correct the first input value into a middle input value. For example, the processor 110 may determine a middle input value by multiplying the first input value by a gain value according to a correction equation, that is, a linear function, and then adding an offset value to the multiplied result. However, the correction equation is not limited to the linear function. For example, the correction equation may be a function of two degrees or more.

A gain value and an offset value may have been stored in the memory 120. Specifically, the gain value and offset value may be received from the outside of the display 10 and stored in the memory 120.

A middle input value may be a real number form. Specifically, when the first input value is multiplied by a gain value and an offset value is added to the multiplied value, a middle input value may include an integer part and a decimal part.

For example, when the first input value is 10, a gain value is 1, and an offset value is 0.5, a middle input value may be 10.5 obtained by multiplying 10 by 1 and adding 0.5 to 10. For another example, when the first input value is 20, a gain value is 2, and an offset value is 0.7, a middle input value may be 40.7 obtained by multiplying 20 by 2 and adding 0.7 to 40.

A value applied to the plurality of pixels 220 may be an integer. A value (e.g., a middle input value) including a decimal part may be used in a calculation process, but a discrete value may be applied to the plurality of pixels 220. Accordingly, the final input value applied to the plurality of pixels 220 may be an integer.

The processor 110 according to an embodiment may compare a value, corresponding to a decimal value indicative of the decimal part of a middle input value, with a root value corresponding to a current pixel. For example, the processor 110 may compare the product of a decimal value indicative of the decimal part of a middle input value and the size of a current block with a root value corresponding to a current pixel. Furthermore, the processor 110 may determine the final input value by rounding up or off a middle input value based on a result of the comparison.

An example in which the processor 110 according to an embodiment determines the final input value by comparing a value corresponding to a decimal value indicative of the decimal part of a middle input value with a root value corresponding to a current pixel and rounding up or off the middle input value based on a result of the comparison is described. Specifically, the processor 110 may compare a first value, obtained by multiplying a decimal value indicative of the decimal part of a middle input value and the size of a current block, with a root value corresponding to a current pixel. If, as a result of the comparison, the root value is smaller than the first value, the processor 110 may the final input value by rounding up the middle input value. If, as a result of the comparison, the root value is greater than or equal to the first value, the processor 110 may the final input value by rounding off the middle input value.

For example, a case where a middle input value of a current pixel is 10.5 and a root value of the current pixel is 9 is described. Since the middle input value is 10.5, a decimal value of the middle input value is 0.5. If the size of a unit block is 4×4, the size of the unit block may be represented as 16. The size of a current block may also be 16 because the current block is a block that belongs to a plurality of unit blocks and that is being processed. Accordingly, a first value, that is, the product of the decimal value and the size of the current block may be 8. In contrast, a root value of the current pixel is 9. Accordingly, the root value is greater. When the root value is greater, the final input value may become 10 by performing rounding-off.

For another example, a case where a middle input value of a current pixel is 10.5 and a root value of the current pixel is 7 is described. Since the middle input value is 10.5, a decimal value of the middle input value is 0.5. When the size of a unit block is 4×4, the size of the unit block may be represented as 16. The size of a current block may also be 16 because the current block is a block that belongs to a plurality of unit blocks and that is being processed. Accordingly, a first value, that is, the product of the decimal value and the size of the current block may be 8. In contrast, a root value of the current pixel is 7. Accordingly, the root value is smaller. When the root value is smaller, the final input value may become 11 by performing rounding-up.

The processor 110 may apply a determined final input value to the plurality of pixels 220 or a current pixel. Furthermore, a gain value, an offset value and a root value may have been stored in the memory 120.

The memory 120 may be widely construed as including a given electronic component capable of storing electronic information. The memory 120 according to an embodiment may refer to various types of processor-readable media, such as random access memory (RAM), read-only memory (ROM), non-volatile random access memory (NVRAM), programmable read-only memory (PROM), erasable-programmable read-only memory (EPROM), electrically erasable PROM (EEPROM), flash memory, magnetic or optical data storage, and registers. If the processor 110 can read information obtained from the memory 120 and/or read information obtained from the memory 120 and can write information in the memory 120, the memory 120 may be said to be an electronic communication state with the processor 110. The memory 120 integrated into the processor 110 may an electronic communication state with the processor 110.

Figure 4:
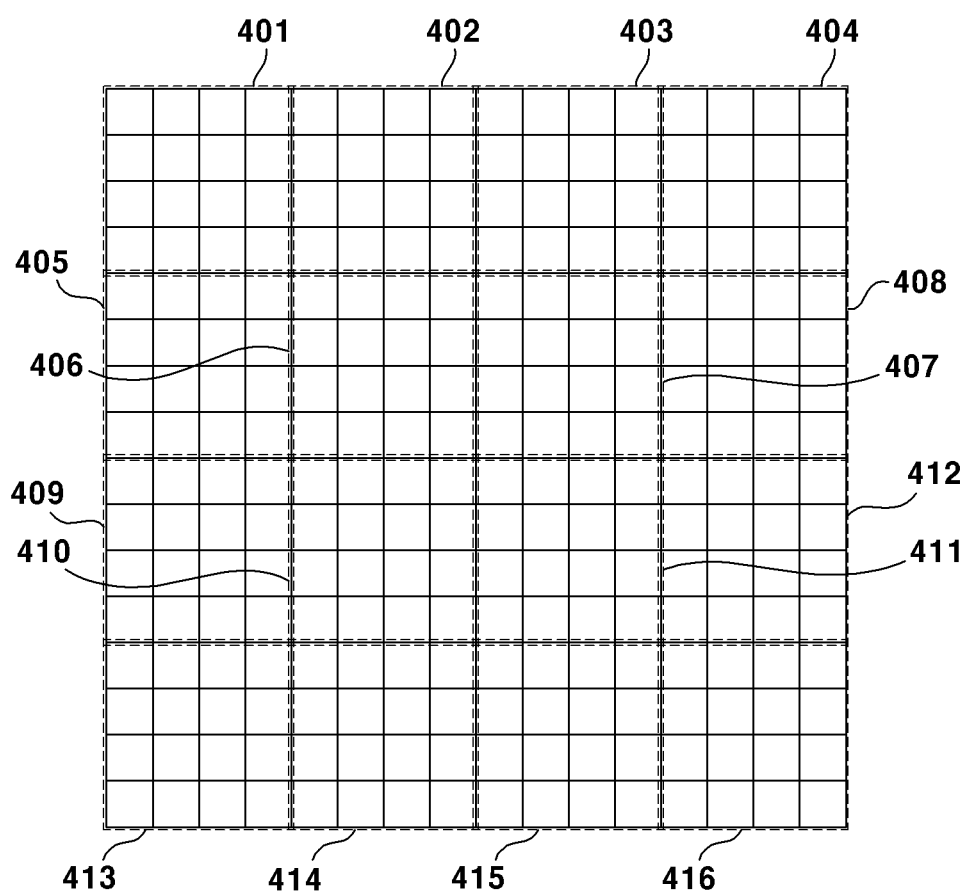
FIG. 4 is a diagram showing an example of a plurality of unit blocks included in the display according to an embodiment.

FIG. 4 is a diagram showing an example of a plurality of unit blocks 401 to 416 included in the display 10 according to an embodiment.

One of the plurality of unit blocks 401 to 416 may be a current block 401. Furthermore, FIG. 4 illustrates a case where the size of the display 10 is 16×16 and the size of a unit block is 4×4, for convenience of illustration, but the present disclosure is not limited to the present embodiment. The current block 401 may be a unit block that belongs to the plurality of unit blocks 401 to 416 and that is being processed.

Figure 5:
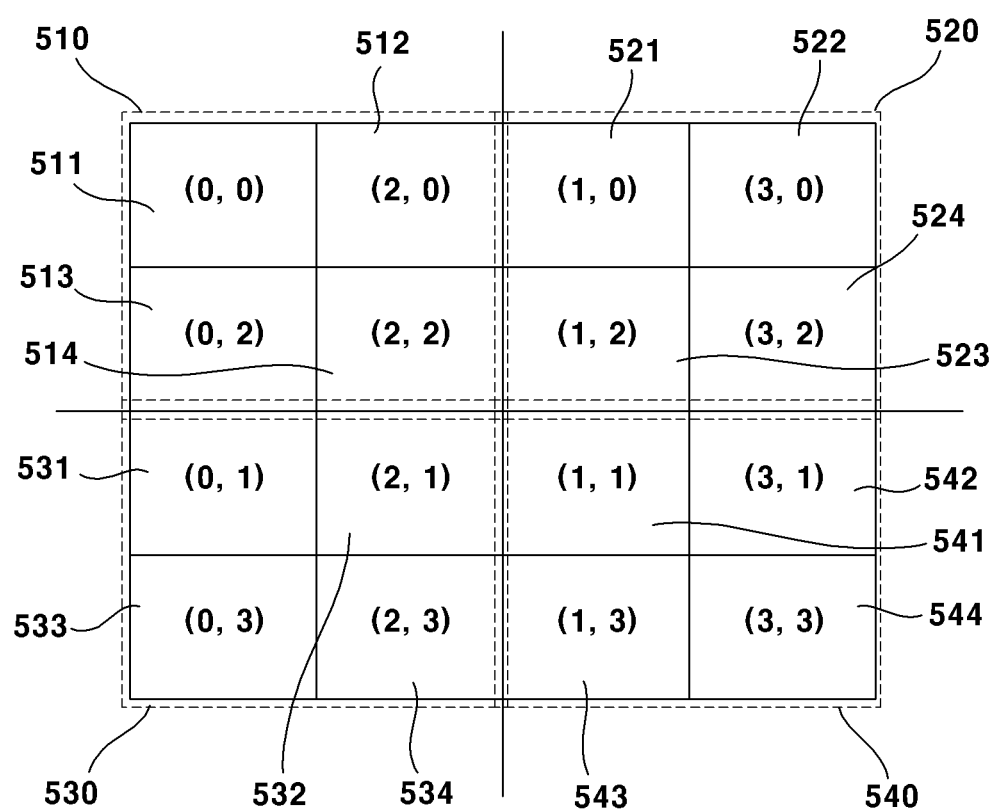
FIG. 5 is a diagram showing an example of the coordinate values of a plurality of pixels included in a unit block divided into a plurality of sections according to an embodiment.

FIG. 5 is a diagram showing an example of the coordinate values of a plurality of pixels included in a unit block 500 divided into a plurality of sections according to an embodiment.

A root value may be determined based on a coordinate value of a current pixel. The coordinate value of the current pixel may be determined in a predetermined manner.

Referring to FIG. 5, in an embodiment, the unit block 500 may be divided into a first section 510, a second section 520, a third section 530 and a fourth section 540. The first section 510 may include a (1-1)-th pixel 511, a (1-2)-th pixel 512, a (1-3)-th pixel 513 and a (1-4)-th pixel 514. The second section 520 may include a (2-1)-th pixel 521, a (2-2)-th pixel 522, a (2-3)-th pixel 523 and a (2-4)-th pixel 524. The third section 530 may include a (3-1)-th pixel 531, a (3-2)-th pixel 532, a (3-3)-th pixel 533 and a (3-4)-th pixel 534. The fourth section 540 may include a (4-1)-th pixel 541, a (4-2)-th pixel 542, a (4-3)-th pixel 543 and a (4-4)-th pixel 544.

Referring to FIG. 5, a coordinate value of each pixel may be randomly determined. Coordinate values of the respective pixels may be sequentially determined, but FIG. 5 shows an example in which the coordinate values of the respective pixels have been determined according to a given determination method.

A root value corresponding to a current pixel may be determined based on a relative position of the current pixel within a current block and the size of the current block. The coordinate value of each pixel may indicate a relative position of a current pixel within a current block. As shown in FIG. 5, the coordinate value of each pixel may be determined in a predetermined manner based on a relative position of a current pixel within a current block.

Furthermore, the coordinate value of each pixel may be used to determine the root value of each pixel. For example, the root value of each pixel may be determined to be a value obtained by adding the horizontal coordinate value of each pixel to a value, that is, the product of the vertical coordinate value of each pixel and the horizontal size of a unit block. For example, in the case of the (3-2)-th pixel 532, since the coordinate value of the (3-2)-th pixel 532 is (2, 1) and the horizontal size of the unit block 500 is 4, the root value of the (3-2)-th pixel 532 may be 6, that is, a value obtained by adding 2 (i.e., the horizontal coordinate value) to the product of 1 (i.e., the vertical coordinate value) and 4 (i.e., the horizontal size of the unit block). For example, in the case of the (4-3)-th pixel 543, since the coordinate value of the (4-3)-th pixel 543 is (1, 3) and the horizontal size of the unit block is 4, the root value of the (4-3)-th pixel 543 may be 13, that is, a value obtained by adding 1 to the product of 3 and 4.

For another example, the root value of each pixel may be determined to be a value obtained by adding the vertical coordinate value of each pixel to the product of the horizontal coordinate value of each pixel and the horizontal size of a unit block. For example, in the case of the (3-2)-th pixel 532, since the coordinate value of the (3-2)-th pixel 532 is (2, 1) and the horizontal size of the unit block is 4, the root value of the (3-2)-th pixel 532 may be 9, that is, a value obtained by adding 1 (i.e., the vertical coordinate value) to the product of 2 (i.e., the horizontal coordinate value) and 4 (i.e., the horizontal size of the unit block). For example, in the case of the (4-3)-th pixel 543, since the coordinate value of the (4-3)-th pixel 543 is (1, 3) and the horizontal size of the unit block is 4, the root value of the (4-3)-th pixel 543 may be 7, that is, a value obtained by adding 3 to the product of 1 and 4.

For another example, the root value of each pixel may be determined to be a value obtained by adding the horizontal coordinate value of each pixel to the product of the vertical coordinate value of each pixel and the vertical size of a unit block. For example, in the case of the (3-2)-th pixel 532, since the coordinate value of the (3-2)-th pixel 532 is (2, 1) and the vertical size of the unit block is 4, the root value of the (3-2)-th pixel 532 may be 6, that is, a value obtained by adding 2 (i.e., the horizontal coordinate value) to the product of 1 (i.e., the vertical coordinate value) and 4 (i.e., the vertical size of the unit block). For example, in the case of the (4-3)-th pixel 543, since the coordinate value of the (4-3)-th pixel 543 is (1, 3) and the vertical size of the unit block is 4, the root value of the (4-3)-th pixel 543 may be 13, that is, a value obtained by adding 1 to the product of 3 and 4.

For another example, the root value of each pixel may be determined to be a value obtained by adding the vertical coordinate value of each pixel to the product of the horizontal coordinate value of each pixel and the vertical size of a unit block. For example, in the case of the (3-2)-th pixel 532, since the coordinate value of the (3-2)-th pixel 532 is (2, 1) and the vertical size of the unit block is 4, the root value of the (3-2)-th pixel 532 may be 9, that is, a value obtained by adding 1 (i.e., the vertical coordinate value) to the product of 2 (i.e., the horizontal coordinate value) and 4 (i.e., the vertical size of the unit block). For example, in the case of the (4-3)-th pixel 543, since the coordinate value of the (4-3)-th pixel 543 is (1, 3) and the vertical size of the unit block is 4, the root value of the (4-3)-th pixel 543 may be 7, that is, a value obtained by adding 3 to the product of 1 and 4.

Figure 6:
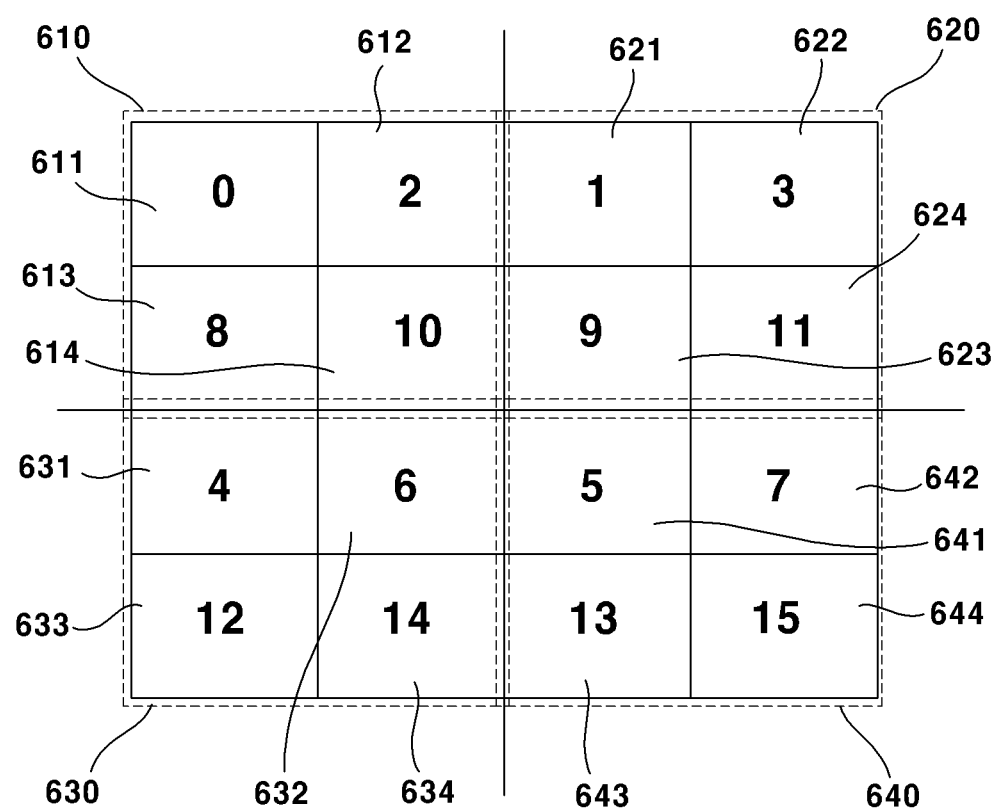
FIG. 6 is a diagram showing an example of the root values of a plurality of pixels included in a current block divided into a plurality of sections according to an embodiment.

FIG. 6 is a diagram showing an example of the root values of a plurality of pixels included in a current block 600 divided into a plurality of sections according to an embodiment.

In one embodiment, root values corresponding to N pixels included in the current block 600 may have integers of different sizes from 1 to N. Referring to FIG. 6, root values of integers of 1 to 16 have been assigned to 16 pixels 611, 612, 613, 614, 621, 622, 623, 624, 631, 632, 633, 634, 641, 642, 643, and 644 included in the current block 600. In this case, FIG. 6 illustrates a case where the root values do not overlap according to an embodiment, but root values may overlap in another embodiment. For example, unlike in the example of FIG. 6, a root value corresponding to the (1-1)-th pixel 611 and a root value corresponding to the (4-3)-th 643 may be the same.

In FIG. 6, the current block 600 according to an embodiment is divided into four sections and described. The current block may be divided into a first section 610, a second section 620, a third section 630 and a fourth section 640, but root values may be determined so that continuous root values are not included in the same section.

Figure 7:
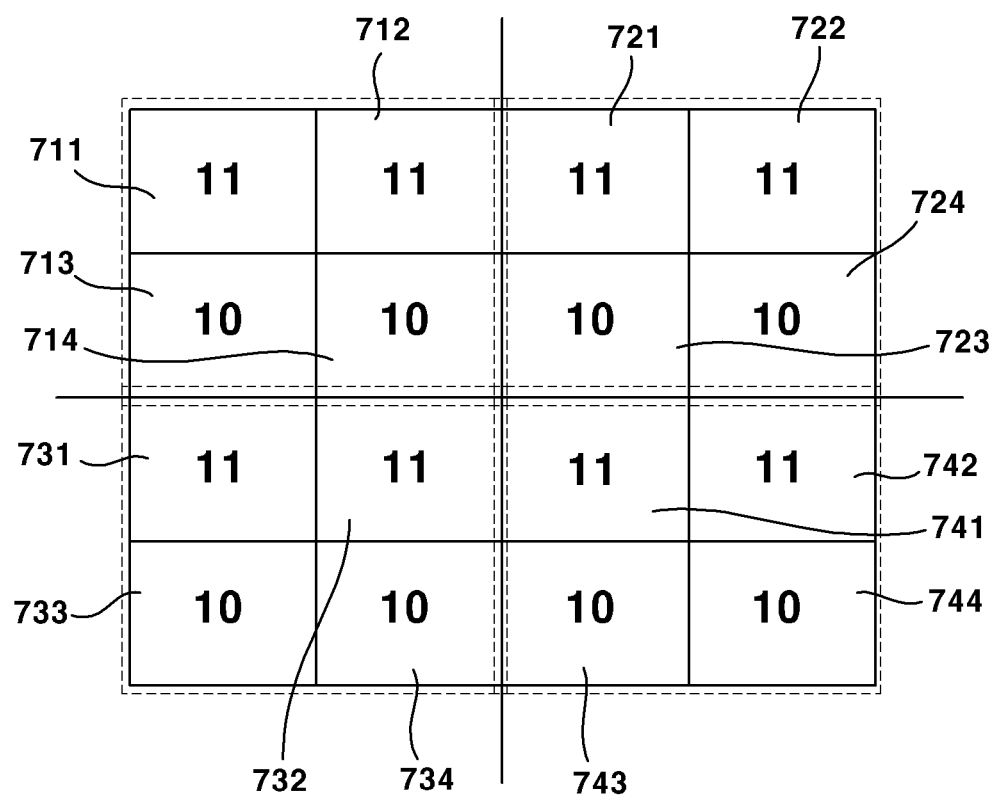
FIG. 7 is a diagram showing an example of the final input values applied to a plurality of pixels included in a current block according to an embodiment.

FIG. 7 is a diagram showing an example of the final input values applied to a plurality of pixels included in a current block 700 according to an embodiment.

FIG. 7 shows a case where the first input value 10 has been applied to 16 pixels 711, 712, 713, 714, 721, 722, 723, 724, 731, 732, 733, 734, 741, 742, 743, and 744 included in the current block 700. Furthermore, FIG. 7 shows a case where a gain value is 1 and an offset value is 0.5. In this case, a middle input value may be 10.5 obtained by multiplying 10 by 1 and adding 0.5 to 10. Accordingly, the decimal value of the middle input value is 0.5. Since the size of the current block 700 is 16(4×4), a first value, that is, the product of the decimal value and the size of the current block, is 8. Accordingly, the module 100 may compare 8 with a root value disclosed in FIG. 6, and may determine the final input value by performing rounding-up on 10.5 if, as a result of the comparison, the root value is smaller than 8 and performing rounding-off on 10.5 if, as a result of the comparison, the root value is equal to or greater than 8.

The size of a block according to an embodiment may mean the number of pixels included in the block. For example, the size of a block of 4×4 may be 16, and the size of a block of 2×2 may be 4.

The numerical values shown in FIG. 7 show an example of the final input values determined based on determined root values after root values are determined using the coordinate values of the respective pixels, but is not limited thereto.

Figure 8:
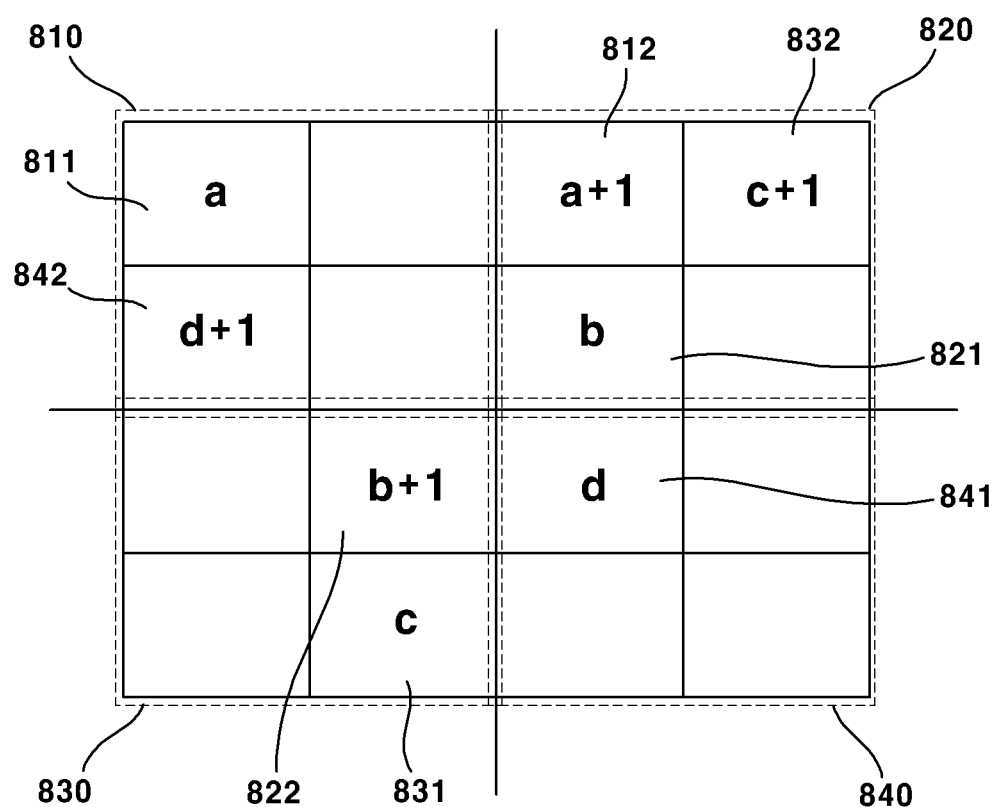
FIG. 8 is a diagram showing an example in which the module determines root values in a plurality of pixels of a plurality of sections according to an embodiment.

FIG. 8 is a diagram showing an example in which the module 100 determines root values in a plurality of pixels of a plurality of sections according to an embodiment.

Referring to FIG. 8, the module 100 may divide a current block into a plurality of sections including a first section 810 and a second section 820, and may determine a root value, corresponding to a (1-2)-th pixel 812 included in the second section 820, to be "a+1" when a root value corresponding to a (1-1)-th pixel 811 included in the first section 810 is "a."

For example, when a root value corresponding to a (2-1)-th pixel 821 included in the second section 820 is "b", a root value corresponding to "b+1" may correspond to a pixel included in one of the first section 810, a third section 830 and a fourth section 840. Referring to FIG. 8, a root value corresponding to "b+1" may correspond to a (2-2)-th pixel 822 included in the third section 830.

For another example, when a root value corresponding to a (3-1)-th pixel 831 included in the third section 830 is "c", a root value corresponding to "c+1" may correspond to a pixel included in one of the first section 810, the second section 820 and the fourth section 840. Referring to FIG. 8, the root value corresponding to "c+1" may correspond to a (3-2)-th pixel 832 included in the second section 820.

For yet another example, when a root value corresponding to a (4-1)-th pixel 841 included in the fourth section 840 is "d", a root value corresponding to "d+1" may correspond to a pixel included in one of the first section 810, the second section 820 and the third section 830. Referring to FIG. 8, the root value corresponding to "d+1" may correspond to a (4-2)-th pixel 842 included in the first section 810.

Accordingly, root values corresponding to pixels included in the same section may not have continuous values.

Figure 9:
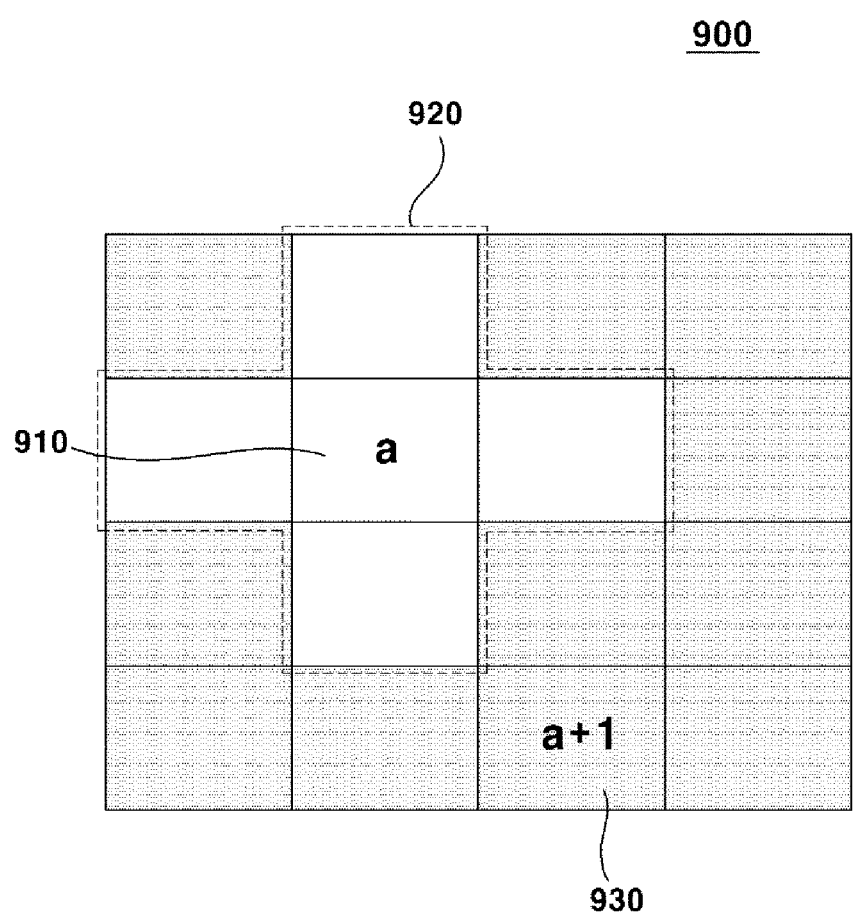
FIG. 9 is a diagram showing an example in which the module determines a root value by determining a pixel neighboring a current pixel and a pixel not neighboring the current pixel according to an embodiment.

FIG. 9 is a diagram showing an example in which the module 100 determines a root value by determining a pixel 920 neighboring a current pixel 910 and a pixel not neighboring the current pixel 910 according to an embodiment.

Referring to FIG. 9, regardless of a section, the module 100 may determine a root value corresponding to a pixel included in a current block 900 so that a root value corresponding to the neighboring pixel 920 of a plurality of pixels is not continuous. In this case, the root value may be an integer.

Specifically, when a root value corresponding to the first pixel 910 is "a", a root value corresponding to the pixel 920 neighboring the first pixel 910 may not be "a+1" or "a−1." For example, a root value corresponding to a second pixel 930 may be "a+1."

Figure 10:
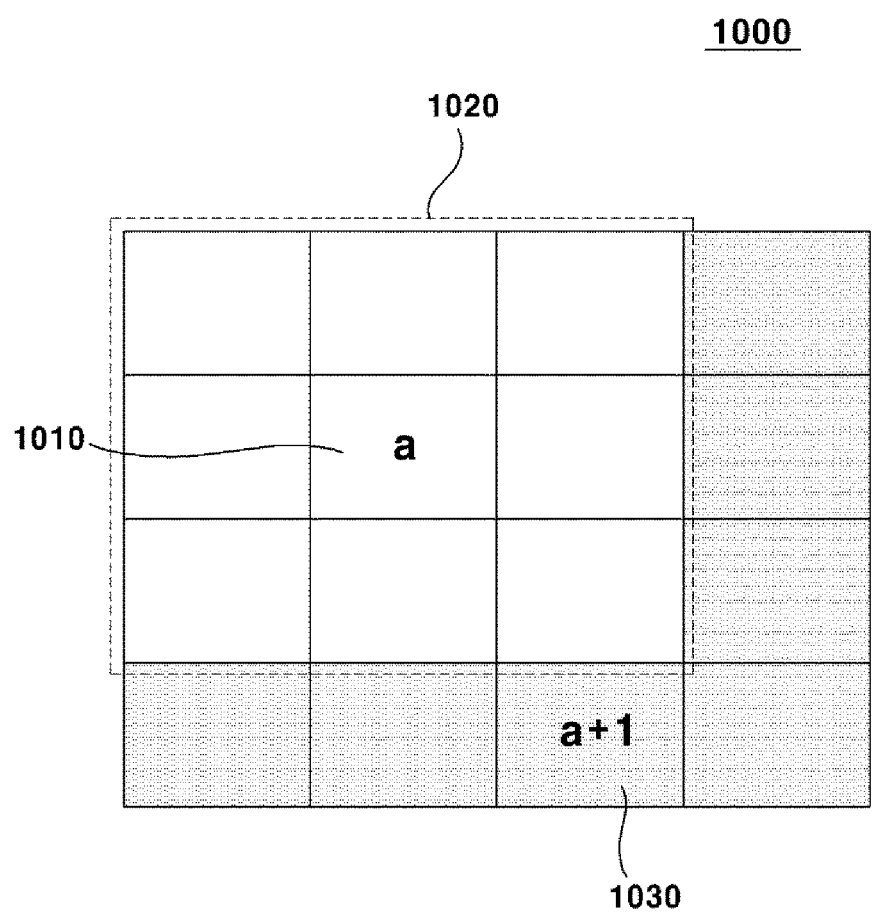
FIG. 10 is a diagram showing an example in which the module determines a root value by determining up to a pixel positioned in a diagonal line to be a pixel neighboring a current pixel according to an embodiment.

FIG. 10 is a diagram showing an example in which the module 100 determines a root value by determining up to a pixel 1020 positioned in a diagonal line to be a pixel neighboring a current pixel 1010 according to an embodiment.

Referring to FIG. 10, regardless of a section, the module 100 may determine a root value corresponding to a pixel included in a current block 1000 so that a root value corresponding to the neighboring pixel 1020 of a plurality of pixels is not continuous. In this case, the root value may be an integer.

Specifically, when a root value corresponding to the first pixel 1010 is "a," a root value corresponding to the pixel 1020 neighboring the first pixel 1010 may not be "a+1" or "a−1." For example, a root value corresponding to a second pixel 1030 may be "a+1."

As may be seen from FIGS. 9 and 10, the range of a "neighboring pixel" may be determined in a predetermined manner.

Figure 11:
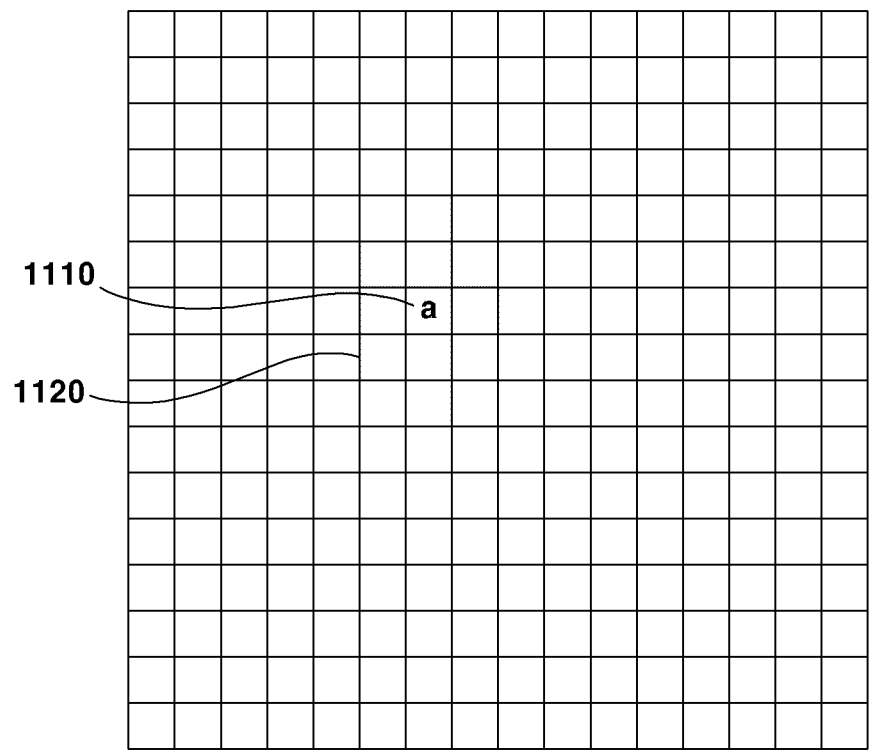
FIG. 11 is a diagram showing an example in which the module determines a pixel neighboring a current pixel and a pixel not neighboring the current pixel according to an embodiment.

For example, FIG. 11 is a diagram showing an example in which the module 100 determines a pixel neighboring a current pixel 1110 and a pixel not neighboring the current pixel according to an embodiment. Referring to FIG. 11, the number of pixels 1120 neighboring the current pixel 1110 may be 12.

Figure 12:
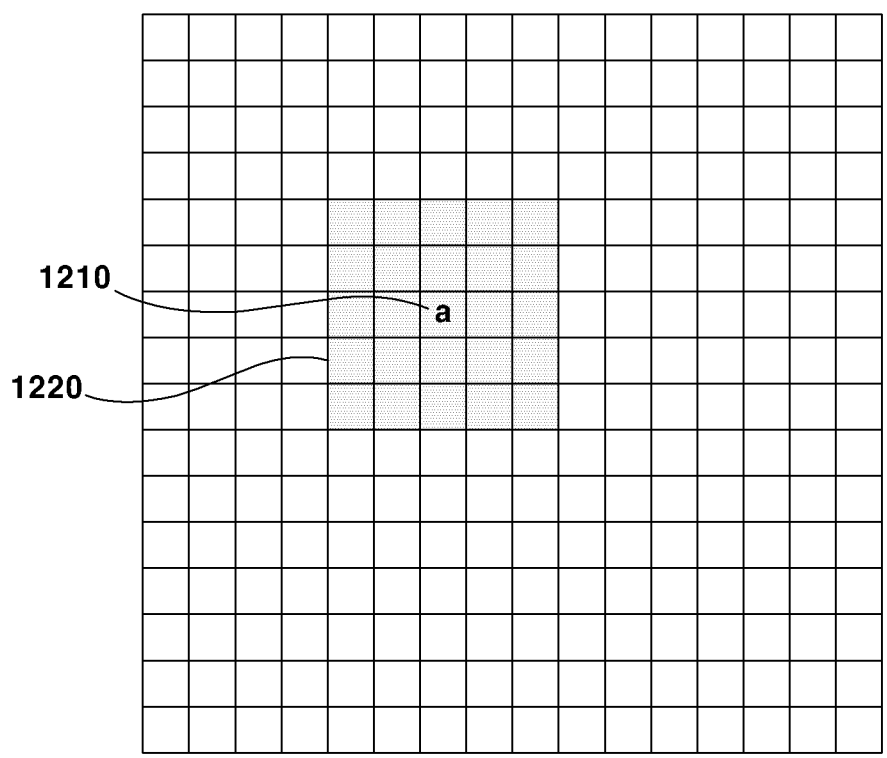
FIG. 12 is a diagram showing an example in which the module determines up to a pixel positioned at a 2-blank distance in the diagonal line to be a pixel neighboring a current pixel according to an embodiment.

For another example, FIG. 12 is a diagram showing an example in which the module 100 determines up to a pixel positioned at a 2-blank distance in the diagonal line to be a pixel neighboring a current pixel 1210 according to an embodiment. Referring to FIG. 12, the number of pixels 1220 neighboring the current pixel 1210 may be 24.

Figure 13:
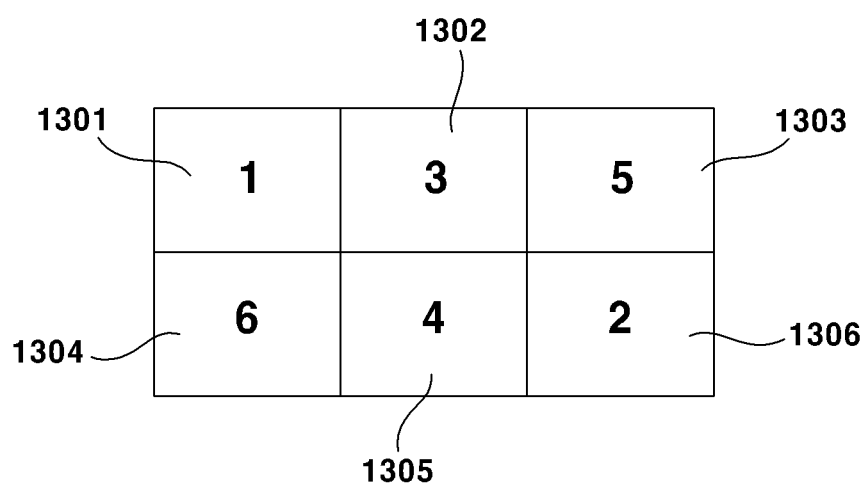
FIG. 13 is a diagram showing an example in which the module determines the root value of a current block having a form other than a square according to an embodiment.

FIG. 13 is a diagram showing an example in which the module 100 determines the root value of a current block 1300 having a form other than a square according to an embodiment.

When the size of the current block 1300 is greater than 2×2, the module 100 according to an embodiment may determine root values corresponding to neighboring pixels included in the current block 1300 so that the root values are not continuous. For example, when a root value corresponding to a first pixel 1301 is 1, root values corresponding to a second pixel 1302 and fourth pixel 1304 may not be 2 continuous to 1. For another example, when a root value corresponding to a sixth pixel 1306 is 2, root values corresponding to a third pixel 1303 and fifth pixel 1305 may not be 3 or 1 continuous to 2.

If the size of the current block 1300 is greater than 2×2, the module 100 according to an embodiment may determine a first root value and a second root value so that the first root value and the second root value correspond to the first pixel 1301 and second pixel 1302 included in the current block 1300, respectively, and the absolute value of a difference between the first root value and the second root value is 2 or more when the first pixel and the second pixel neighbor each other. Referring to FIG. 13, the absolute value of a difference between 1 and 3 is 2 because the first root value is 1 and the second root value is 3. Accordingly, the above condition may be satisfied.

Figure 14:
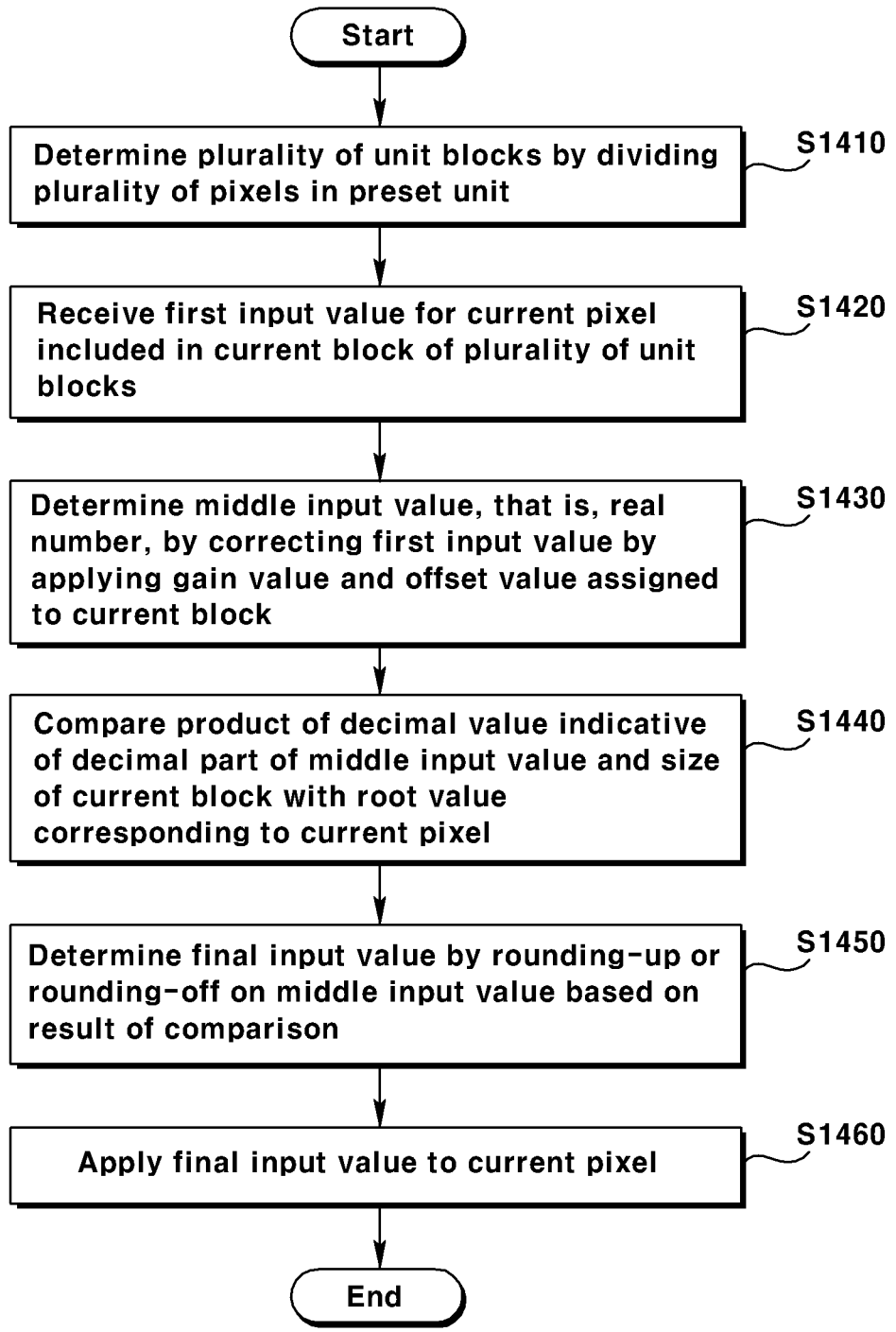
FIG. 14 is a flowchart showing a method for the module to correct an input value and to apply the corrected value to a current pixel according to an embodiment.

FIG. 14 is a flowchart showing a method for the module 100 to correct an input value and to apply the corrected value to a current pixel according to an embodiment.

Referring to FIG. 14, there is disclosed a correction method of correcting and applying an input value applied to a plurality of pixels in the display 10 including the plurality of pixels.

In step S1410, the module 100 according to an embodiment determines a plurality of unit blocks by dividing a plurality of pixels in a preset unit.

In step S1420, the module 100 according to an embodiment receives the first input value for a current pixel included in a current block of the plurality of unit blocks.

In step S1430, the module 100 according to an embodiment determines a middle input value, that is, a real number, by correcting the first input value by applying a gain value and offset value assigned to the current block.

In step S1440, the module 100 according to an embodiment compares the product of a decimal value indicative of the decimal part of the middle input value and the size of the current block with a root value corresponding to the current pixel.

In step S1450, the module 100 according to an embodiment determines the final input value by rounding-up or rounding-off on the middle input value based on a result of the comparison in step S1440.

In step S1460, the module 100 according to an embodiment applies the final input value to the current pixel.

For a detailed operation of each step, reference may be made to the description of the module 100 in FIGS. 1 to 13.

The aforementioned method may be written in a program executable in a computer and may be implemented in a general-purpose digital computer for driving the program using a computer-readable recording medium. Furthermore, the structure of data used in the aforementioned method may be written in a computer-readable recording medium through several means. The computer-readable recording medium includes storage media, such as magnetic storage media (e.g., ROM, RAM, a USB, a floppy disk and a hard disk) and optical recording media (e.g., CD-ROM and a DVD).

The present disclosure can provide the method and module for processing image data.

A person having ordinary skill in the art, who is related to the embodiments, will understand that the present invention may be implemented in a modified form without departing from the intrinsic characteristics of the present invention. Accordingly, the disclosed methods should be considered from a descriptive viewpoint not a limitative viewpoint. The range of the present invention appears in the claims not the aforementioned description, and all of differences within an equivalent range thereof should be construed as being included in the present invention.

What is claimed is:

1. A module for correcting and applying an input value applied to a plurality of pixels in a display comprising a plurality of pixels, the module comprising:
a processor configured to determine a plurality of unit blocks by dividing the plurality of pixels in a preset unit, receive a first input value for a current pixel included in a current block of the plurality of unit blocks, determine a middle input value of a real number by correcting the first input value by applying a gain value and offset value assigned to the current block, compare a product of a decimal value indicative of a decimal part of the middle input value and a size of the current block with a root value corresponding to the current pixel, determine a final input value by performing rounding-up or rounding-off on the middle input value based on a result of the comparison, and apply the final input value to the current pixel of the display; and
memory configured to store the gain value, the offset value and the root value; the stored gain value, the stored offset value and the stored root value being used to calculate the final input value being applied to the current pixel;
said root value, corresponding to the current pixel, being calculated using the coordinate values of the current pixel within the current block and the size of the current block.

2. The module of claim 1, wherein root values corresponding to N pixels included in the current block have integers of different sizes from 1 to N.

3. The module of claim 2, wherein the processor is configured to:
divide the current block into a plurality of sections comprising a first section and a second section, and
determine a root value corresponding to a second pixel included in the second section to be a+1 when a root value corresponding to a first pixel included in the first section is a.

4. The module of claim 2, wherein:
the processor is configured to determine root values corresponding to pixels included in the current block so that root values corresponding to neighboring pixels of the plurality of pixels are not continuous, and
the root value is an integer.

5. The module of claim 2, wherein the processor is configured to:
divide the current block into four sections comprising a first section to a fourth section, and
determine a root value of a+1 to correspond to a pixel included in any one of the second section to the fourth section when a root value corresponding to a pixel included in the first section is a.

6. The module of claim 2, wherein the processor is configured to determine root values corresponding to neighboring pixels included in the current block to not overlap when the size of the current block is greater than 2×2.

7. The module of claim 2, wherein if the size of the current block is greater than 2×2, the processor is configured to determine a first root value and a second root value so that the first root value and second root value correspond to a first pixel and second pixel included in the current block, respectively, and an absolute value of a difference between the first root value and the second root value is 2 or more if the first pixel and the second pixel neighbor each other.

8. A correction method of correcting and applying an input value applied to a plurality of pixels in a display comprising the plurality of pixels, the method comprising:
determining a plurality of unit blocks by dividing the plurality of pixels in a preset unit;
receiving a first input value for a current pixel included in a current block of the plurality of unit blocks;
determining a middle input value which is a real number by correcting the first input value by applying a gain value and offset value assigned to the current block;
comparing a product of a decimal value indicative of a decimal part of the middle input value and a size of the current block with a root value corresponding to the current pixel, the root value, corresponding to the current pixel, being calculated using the coordinate values of the current pixel within the current block and the size of the current block;

determining a final input value by performing rounding-up or rounding-off on the middle input value based on a result of the comparison; and applying the final input value to the current pixel of the display.

9. The module of claim 1, wherein said root value of the current pixel is calculated by adding a horizontal coordinate value of the current pixel to a product of a vertical coordinate value of the current pixel and a horizontal size of the current block.

10. The module of claim 1, wherein said root value of the current pixel is calculated by adding a vertical coordinate value of the current pixel to a product of a horizontal coordinate value of the current pixel and a horizontal size of the current block.

11. The module of claim 1, wherein said root value of the current pixel is calculated by adding a horizontal coordinate value of the current pixel to a product of a vertical coordinate value of the current pixel and a vertical size of the current block.

12. The module of claim 1, wherein said root value of the current pixel is calculated by adding a vertical coordinate value of the current pixel to a product of a horizontal coordinate value of the current pixel and a vertical size of the current block.

13. The method of claim 8, wherein the root value of the current pixel is calculated by adding a horizontal coordinate value of the current pixel to a product of a vertical coordinate value of the current pixel and a horizontal size of the current block.

14. The method of claim 8, wherein the root value of the current pixel is calculated by adding a vertical coordinate value of the current pixel to a product of a horizontal coordinate value of the current pixel and a horizontal size of the current block.

15. The method of claim 8, wherein the root value of the current pixel is calculated by adding a horizontal coordinate value of the current pixel to a product of a vertical coordinate value of the current pixel and a vertical size of the current block.

16. The method of claim 8, wherein the root value of the current pixel is calculated by adding a vertical coordinate value of the current pixel to a product of a horizontal coordinate value of the current pixel and a vertical size of the current block.

\* \* \* \* \*